July 25, 1967  A. D. LEWIS  3,332,419
HYPODERMIC INJECTION DEVICE
Filed Nov. 14, 1963
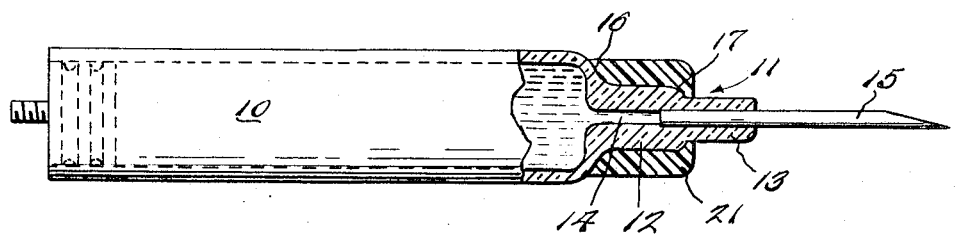
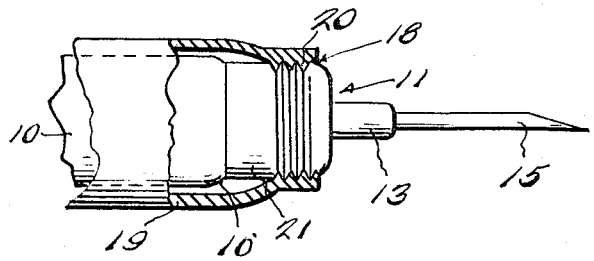
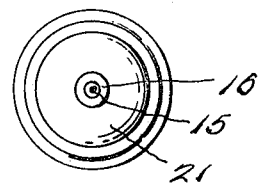
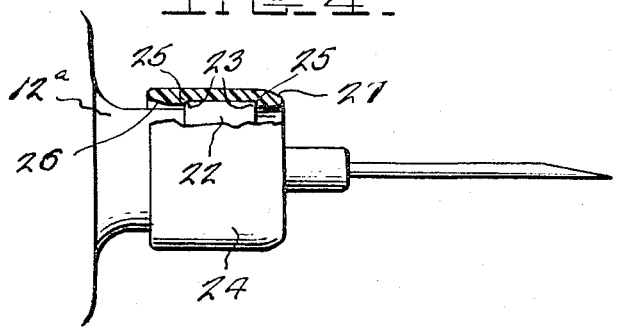
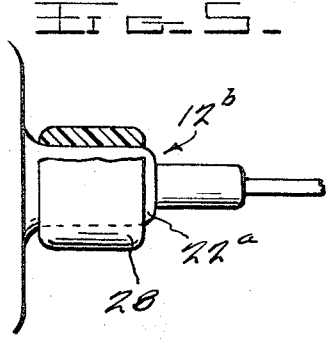
INVENTOR.
ALBERT D. LEWIS
BY E. J. Holler &
W. A. Schaich
ATTORNEYS United States Patent Office
3,332,419
Patented July 25, 1967

3,332,419
HYPODERMIC INJECTION DEVICE
Albert D. Lewis, Toledo, Ohio, assignor to Owens-Illinois, Inc., a corporation of Ohio
Filed Nov. 14, 1963, Ser. No. 323,672
3 Claims. (Cl. 128—218)

ABSTRACT OF THE DISCLOSURE

This invention relates to hypodermic injection syringe devices of the adjustable type adapted to receive a unit-dose disposable cartridge which is retained within the syringe at its delivery end by a self-threading resilient tubular member.

---

My invention relates to hypodermic injection devices and has for an important object the provision of novel effective means for separably interconnecting the distal end of a conventional disposable glass cartridge, containing an injectable material, and the distal end of a syringe or cartridge holder, which, when assembled produce an injection device.

It is conventional practice in this field, to attach an externally threaded metal ferrule to and as a longitudinal extension of the distal end of the glass cartridge and following initial placement of the latter in a syringe or cartridge holder, thread the ferrule into an internally screw-threaded collar at the distal end of said syringe. These threads much match properly to insure satisfactory assembling and such is not always easily attained in practice. Mis-matching may well result in an inoperative device and, for example, one which will not permit practicing the technique of aspiration, because the cartridge may remain free to move bodily away from the distal end of the syringe concurrently with slight reverse movement of the plunger during such aspiration.

An important object of my invention, therefore, is the provision of a simple, readily effected separable connection between the distal ends of a glass cartridge and syringe which is positively reliable and capable of being effected quickly and with assurance that there can be no premature axial separation of the cartridge from the syringe incident to aspiration, for example.

A further object of my invention is the provision of a deformable plastic collar, or ring, which encircles and is secured to the distal end of the cartridge so that incident to rotation and axial movement of such cartridge the threads of the collar on the syringe will cut threads into the plastic and thereby firmly secure the injection device parts assembled.

It is also an object of my invention to provide a plastic collar, as just mentioned, which, while soft enough to deform on threading into the syringe, is sufficiently hard or tough, to effectively resist stripping under the longitudinal forces involved, for example, during the previously explained aspiration procedure.

Other objects will be in part apparent and in part pointed out hereinafter.

In the accompanying drawings forming a part of my application:

FIG. 1 is a sectional elevational view of a cartridge embodying my invention.

FIG. 2 is a fragmentary sectional elevational view showing my invention embodied in an assembled cartridge and syringe.

FIG. 3 is an end view of the parts shown in FIG. 2.

FIG. 4 is a sectional elevational view of a modified form of my invention.

FIG. 5 is a sectional elevational view of still another possible form of my invention.

In FIGS. 1–3 I have illustrated a preferred form of my invention which is ideally suited to embodiment in, or use with, an injection device such as that forming the subject matter of U.S. Patent to Dann et al., No. 2,830,586, issued Apr. 15, 1958, to which reference may be had for details of the basic device involved. In this patent, the cartridge needle unit has affixed to its forward end a pre-threaded metal ferrule which is threaded into an already threaded opening at the front end of the syringe barrel.

According to my invention, the cartridge 10 is a glass cylinder having its forward end 11 reduced in diameter providing an axial extension 12 terminating in a relatively small diameter nose portion 13, these elements having a continuous longitudinal bore 14 substantially, if not precisely, co-axial with and opening into the cylinder proper. A conventional injection needle 15 may be cemented or otherwise secured in said bore 14, utilizing any of the many well known sealants for this purpose. The reduced extension 12 and cylinder create an annular shoulder 16 or abutment at the forward end of the latter and the presence of the reduced nose portion 13 creates an annular shoulder 17 at the juncture of the nose portion and said extension. In assembling a cartridge, as just described, with a gun as shown in the above Dann et al. patent, the reduced extension 12 and nose portion 13 are projected, at least in part, through an axial opening 18 (FIG. 2) in the forward end of the barrel 19 and releasably, yet firmly, secured therein.

Utilizing my invention, with the opening 18 in the metal barrel 19 of the gun already provided with screw-threads 20, I secure to the extension 12 an unthreaded collar 21 or ring, which is of slightly smaller internal diameter than the extension diameter and formed of a tough rubber-like material capable of being deformed by the screw-thread 20, yet so interengageable with said threads as to effectively resist stripping under longitudinal forces encountered in use, such for example, as during aspiration. This aspirating procedure, which is a conventional technique, involves withdrawal of a small amount of tissue fluid to ascertain whether a blood vessel has been entered and such requires positive connection between the cartridge and barrel to insure against relative axial movement of the barrel and cartridge, as is evident. Accordingly, the collar 21 which encases the cartridge extension 12 and, may, as shown engage both shoulders 16 and 17 at the ends of said extension, may be formed of polyethylene, polyvinyl chloride or other suitable plastic material. While such collar may be frictionally retained upon the extension, it may under some circumstances be more satisfactory to employ a cement or bonding agent (not shown) to positively secure the collar in place. Many bonding agents are available for this purpose. It is apparent that assembling a cartridge as above described with a gun as disclosed in the Dan et al. patent, involves simply inserting the nose 13 of the cartridge into the barrel opening 18 and concurrently with continuation of axial movement of the cartridge, rotating the latter so that the screw-threads 20 of the barrel cut threads into the collar. Thus the cartridge and barrel are firmly secured together without the necessity of carefully matching the screw-threads. Also the obviously relatively substantial cost of screw-threading one part of the assembly is eliminated. The net result is the provision of a comparatively inexpensive disposable cartridge.

In FIG. 4 I have shown another form of my invention wherein the cartridge extension 12a embodies an annular rib 22 which has an annular stop 23 at each end disposed in a plane about normal to the axis of the cartridge. A plastic, or rubber-like collar 24, having an internal annular shoulder 25 near each end fits over this rib 22, with the shoulders firmly engaging the stops 23. Thus the collar is firmly held against independent bodily movement. One end of this collar is provided internally with a tapered guiding surface 26 which facilitates assembly with a cartridge and at its other end is tapered externally to create a guiding surface 27 which aids in insertion of the cartridge extension into the barrel opening.

In FIG. 5 I have shown still another form of my invention in which the cartridge extension 12ᵇ embodies an annular external surface 22ᵃ, but wherein the collar 28 is a suitable resin both applied directly to and cured on the glass.

The manner in which my invention functions is believed to be abundantly clear in the foregoing description.

Modifications may be resorted to within the spirit and scope of the appended claims.

I claim:

1. In an adjustable hypodermic syringe injection device having an operable piston rod member movable within a surrounding barrel, an interiorly-threaded opening at the delivery end of said barrel, and a medicament cartridge in said barrel, said cartridge having a cylindrical hollow glass body portion and a metallic needle sealed into the delivery end of said cartridge, and a resilient plunger member disposed interiorly of the body portion of said cartridge interconnecting with said piston rod member, wherein the improvement comprises a resilent tubular member surrounding the needle-retaining end of said cartridge in self-threaded engagement within the internally-threaded delivery opening of said syringe barrel, said collar in self-threaded engagement with said barrel opening preventing longitudinal displacement of said cartridge within said syringe device during its operation and use.

2. A medicant cartridge in accordance with claim 1, wherein said tubular member is comprised of plastic deformable material having an originally smooth exterior surface with a diameter complemental to the root diameter of the internally-threaded delivery opening of said syringe barrel for self-threading engagement therewithin.

3. A medicant cartridge in accordance with claim 1, wherein said tubular member is firmly adhered against relative movement to the delivery end of said cartridge.

References Cited

UNITED STATES PATENTS

| 841,701 | 1/1907 | De Lisle | 128—218 |
| 1,718,602 | 6/1929 | Smith | 128—218 |
| 1,718,605 | 6/1929 | Smith | 128—218 |
| 2,423,762 | 7/1947 | Everett | 128—215 |
| 2,677,373 | 5/1954 | Barradas | 128—216 |
| 2,830,586 | 4/1958 | Dann et al. | 128—218 |
| 2,845,067 | 7/1958 | Gabriel | 128—272 X |

FOREIGN PATENTS

| 505,212 | 5/1939 | Great Britain. |

RICHARD A. GAUDET, *Primary Examiner.*

DALTON L. TRULUCK, *Examiner.*